US009784187B2

United States Patent
Wolfe et al.

(10) Patent No.: US 9,784,187 B2
(45) Date of Patent: Oct. 10, 2017

(54) TWO FLOW PATH FUEL CONDUIT OF A GAS TURBINE ENGINE

(71) Applicant: GENERAL ELECTRIC COMPANY, Schenectady, NY (US)

(72) Inventors: Jared Matthew Wolfe, Cincinnati, OH (US); Joshua Daniel Brown, Cincinnati, OH (US); Christopher Francis Poranski, Cincinnati, OH (US); Edward J. Condrac, Cincinnati, OH (US); Raymond Floyd Martell, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 221 days.

(21) Appl. No.: 14/407,400

(22) PCT Filed: Jun. 14, 2013

(86) PCT No.: PCT/US2013/045766
§ 371 (c)(1),
(2) Date: Dec. 11, 2014

(87) PCT Pub. No.: WO2013/188723
PCT Pub. Date: Dec. 19, 2013

(65) Prior Publication Data
US 2015/0121883 A1 May 7, 2015

Related U.S. Application Data

(60) Provisional application No. 61/660,533, filed on Jun. 15, 2012.

(51) Int. Cl.
*F02C 7/22* (2006.01)
*F02C 7/24* (2006.01)
*F01D 25/00* (2006.01)

(52) U.S. Cl.
CPC .............. *F02C 7/222* (2013.01); *F01D 25/00* (2013.01); *F02C 7/24* (2013.01)

(58) Field of Classification Search
CPC .. F02C 7/22; F02C 7/222; F02C 7/228; F02C 7/24; F23R 3/28; F23R 3/283
See application file for complete search history.

(56) References Cited

U.S. PATENT DOCUMENTS 4,467,610 A * 8/1984 Pearson ................. F02C 7/222
138/114
4,735,044 A 4/1988 Richey et al.
(Continued)

FOREIGN PATENT DOCUMENTS

| CN | 1069561 A | 3/1993 |
| CN | 1782344 A | 6/2006 |

(Continued)

OTHER PUBLICATIONS

European Search Report and Opinion issued in connection with Related EP Application No. 16165043.7 dated Sep. 13, 2016.
(Continued)

Primary Examiner — Pascal M Bui Pho
Assistant Examiner — Marc Amar
(74) Attorney, Agent, or Firm — General Electric Company; Brian P. Overbeck (57) ABSTRACT

A gas turbine engine is provided. The gas turbine engine includes a compressor assembly and a combustion assembly in flow communication with the compressor assembly. The combustion assembly includes a plurality of fuel nozzles and a fluid conduit for delivering fuel to the fuel nozzles. The fluid conduit has a plurality of first outlet ports that are spaced apart from one another along the fluid conduit, and the fluid conduit also has a plurality of second outlet ports that are spaced apart from one another along the fluid
(Continued)

conduit. The fluid conduit further has a first flow path extending along the fluid conduit in flow communication with the first outlet ports, and the fluid conduit also has a second flow path extending along the fluid conduit in flow communication with the second outlet ports. At least a portion of the first flow path is circumscribed by the second flow path.

20 Claims, 8 Drawing Sheets

(56) References Cited

U.S. PATENT DOCUMENTS

| | | | |
|---|---|---|---|
| 5,218,824 A | 6/1993 | Cederwall et al. | |
| 5,263,314 A * | 11/1993 | Anderson | F02C 7/222 137/312 |
| 5,427,419 A * | 6/1995 | Frey | F16L 39/04 285/123.1 |
| 6,672,066 B2 | 1/2004 | Wrubel et al. | |
| 6,955,040 B1 | 10/2005 | Myers, Jr. et al. | |
| 7,269,939 B2 | 9/2007 | Kothnur et al. | |
| 7,654,088 B2 | 2/2010 | Shafique et al. | |
| 7,703,289 B2 | 4/2010 | Rudrapatna et al. | |
| 7,716,933 B2 | 5/2010 | Prociw et al. | |
| 2004/0040306 A1 * | 3/2004 | Prociw | F02C 7/222 60/740 |
| 2004/0148938 A1 | 8/2004 | Mancini et al. | |
| 2007/0044477 A1 | 3/2007 | Held et al. | |
| 2007/0204621 A1 | 9/2007 | Fish | |
| 2007/0204622 A1 * | 9/2007 | Patel | B23B 1/00 60/772 |
| 2008/0016870 A1 | 1/2008 | Morenko | |
| 2008/0083223 A1 * | 4/2008 | Prociw | F02C 7/222 60/739 |
| 2009/0120522 A1 | 5/2009 | Ziaei et al. | |
| 2010/0050645 A1 * | 3/2010 | Haggerty | F02C 7/222 60/739 |
| 2010/0051726 A1 * | 3/2010 | Houtman | F02C 7/222 239/548 |
| 2011/0000219 A1 | 1/2011 | Myers, Jr. et al. | |
| 2012/0145247 A1 | 6/2012 | Pelletier et al. | |
| 2012/0145273 A1 * | 6/2012 | Pelletier | F02C 7/222 138/111 |

FOREIGN PATENT DOCUMENTS

| | | |
|---|---|---|
| EP | 0527629 A1 | 2/1993 |
| EP | 1830036 A2 | 9/2007 |
| EP | 1908940 | 4/2008 |
| EP | 2902605 A1 | 8/2015 |
| JP | 04-314933 A | 11/1992 |
| JP | 2011-526974 A | 10/2011 |
| JP | 2011-526975 A | 10/2011 |
| WO | 2009148680 A2 | 12/2009 |
| WO | 2010024989 | 3/2010 |

OTHER PUBLICATIONS

GE Related Case Form.
Unofficial English Translation of Chinese Office Action issued in connection with corresponding CN Application No. 201380031620.5 dated Jun. 30, 2015.
International Search Report and Written Opinion dated Sep. 27, 2013 which was issued in connection with PCT Application No. PCT/US13/45766 which was filed on Jun. 14, 2013.
Notification of Reasons for Refusal issued in connection with corresponding JP Application No. 2015-517444 dated Apr. 4, 2017.
Notification of Reasons for Refusal issued in connection with related JP Application No. 2016-078550 dated Apr. 11, 2017.
U.S. Appl. No. 14/685,631, filed Apr. 14, 2015, Wolfe.
U.S. Non-Final Office Action issued in connection with Related U.S. Appl. No. 14/685,631 dated Jan. 9, 2017.

* cited by examiner

TWO FLOW PATH FUEL CONDUIT OF A GAS TURBINE ENGINE

CROSS-REFERENCE TO RELATED APPLICATIONS

This application claims the benefit of U.S. Provisional Patent Application No. 61/660,533, which was filed on Jun. 15, 2012 and is incorporated by reference herein in its entirety.

BACKGROUND OF THE INVENTION

The field of this disclosure relates generally to fluid conduits and, more particularly, to fluid conduits for fuel in a gas turbine engine.

Many known gas turbine engines include a combustor segment, and fuel is delivered to the combustor segment via a network of conduits to facilitate the combustion process. Because the fuel conduits are situated near the combustion zone of the engine, the fuel can be exposed to increased temperatures within the conduits.

In at least some known gas turbine engines, the flow rate of fuel to the combustor segment differs from one mode of engine operation (e.g., take-off operation) to another mode of engine operation (e.g., cruise operation). However, when the engine is operating in a mode at which the flow rate is lower, the fuel may be exposed to increased temperatures for a longer amount of time. It would be useful, therefore, to better insulate the fuel from increased temperatures associated with engine operation.

BRIEF DESCRIPTION OF THE INVENTION

In one aspect, a gas turbine engine is provided. The gas turbine engine includes a compressor assembly and a combustion assembly in flow communication with the compressor assembly. The combustion assembly includes a plurality of fuel nozzles and a fluid conduit for delivering fuel to the fuel nozzles. The fluid conduit has a plurality of first outlet ports that are spaced apart from one another along the fluid conduit, and the fluid conduit also has a plurality of second outlet ports that are spaced apart from one another along the fluid conduit. The fluid conduit further has a first flow path extending along the fluid conduit in flow communication with the first outlet ports, and the fluid conduit also has a second flow path extending along the fluid conduit in flow communication with the second outlet ports. At least a portion of the first flow path is circumscribed by the second flow path.

In another aspect, a fluid conduit for a combustion assembly of a gas turbine engine is provided. The fluid conduit includes a plurality of first outlet ports that are spaced apart from one another along the fluid conduit, and the fluid conduit also includes a plurality of second outlet ports that are spaced apart from one another along the fluid conduit. The fluid conduit further includes a first flow path extending along the fluid conduit in flow communication with the first outlet ports, and the fluid conduit also includes a second flow path extending along the fluid conduit in flow communication with the second outlet ports. At least a portion of the first flow path is circumscribed by the second flow path.

In another aspect, a method of fabricating a fluid conduit for a combustion assembly of a gas turbine engine is provided. The method includes providing a plurality of first outlet ports that are spaced apart from one another along the fluid conduit. The method also includes providing a plurality of second outlet ports that are spaced apart from one another along the fluid conduit. The method further includes integrally forming a first flow path and a second flow path that extend along the fluid conduit such that at least a portion of the first flow path is circumscribed by the second flow path. The first flow path is in flow communication with the first outlet ports, and the second flow path is in flow communication with the second outlet ports.

DETAILED DESCRIPTION OF THE INVENTION

The following detailed description sets forth a fluid conduit and a method of fabricating the same by way of example and not by way of limitation. The description should clearly enable one of ordinary skill in the art to make and use the fluid conduit, and the description sets forth several embodiments, adaptations, variations, alternatives, and uses of the fluid conduit, including what is presently believed to be the best mode thereof. The fluid conduit is described herein as being applied to a preferred embodiment, namely a fuel conduit of a fuel delivery system in a gas turbine engine. However, it is contemplated that the fluid conduit and the method of fabricating the fluid conduit may have general application in a broad range of systems and/or a variety of commercial, industrial, and/or consumer applications other than fuel flow within gas turbine engines.

Figure 1:
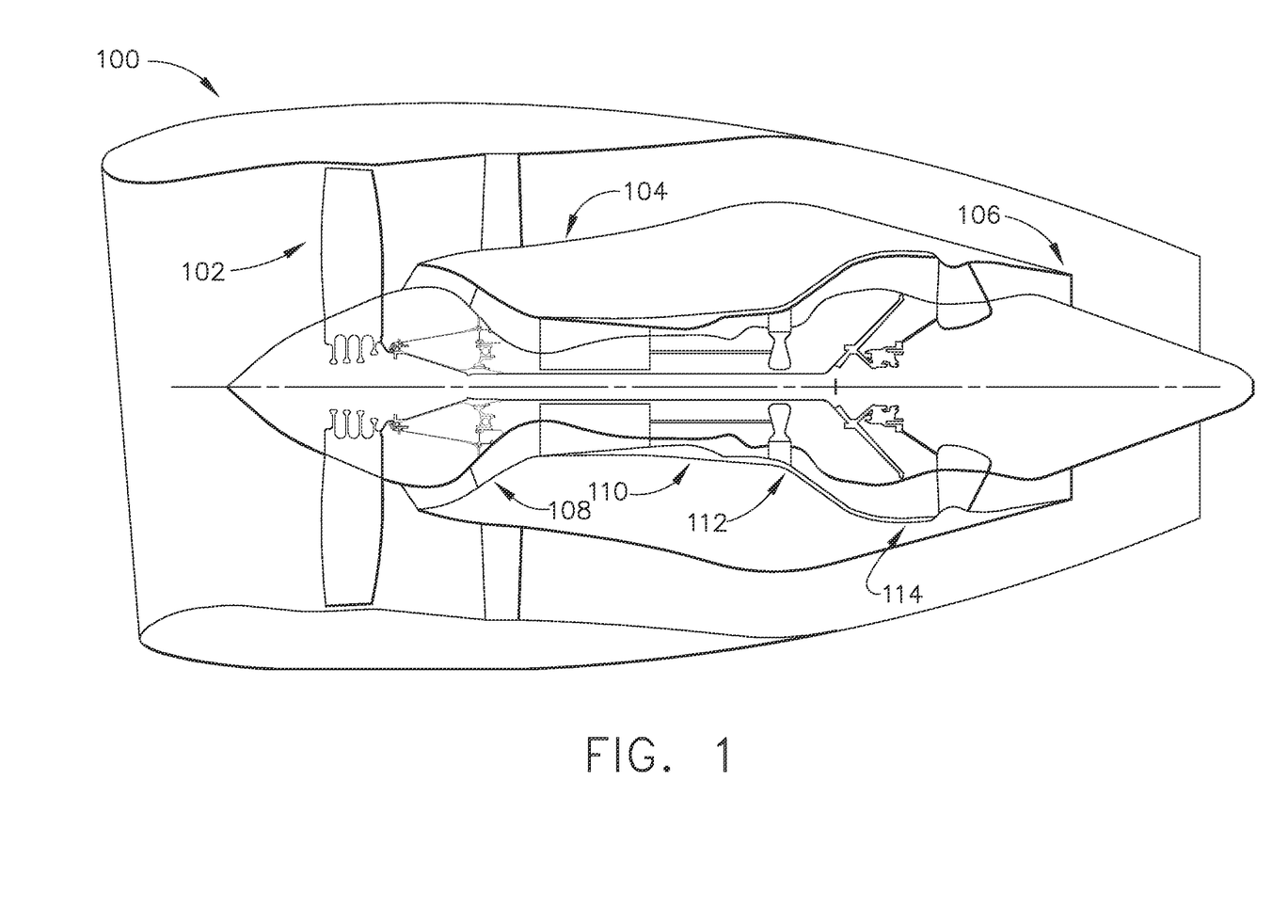
FIG. 1 is a schematic representation of a gas turbine engine.

FIG. 1 is a schematic illustration of an exemplary gas turbine engine 100. Gas turbine engine 100 includes a fan system 102, a core system 104, and an exhaust system 106 arranged in axial flow communication with one another. Core system 104 includes a compressor assembly 108, a combustion assembly 110, a high pressure turbine assembly 112, and a low pressure turbine assembly 114. During operation, air is directed into compressor assembly 108, and the air is compressed and is then directed into combustion assembly 110. Within combustion assembly 110, the compressed air is mixed with fuel and ignited to generate combustion gas, and the combustion gas is subsequently directed through high pressure turbine assembly 112 and low pressure turbine assembly 114 for discharge into the ambient via exhaust system 106. In other embodiments, gas turbine engine 100 may include any suitable fan system, core system, and/or exhaust system configured in any suitable manner.

Figure 2:
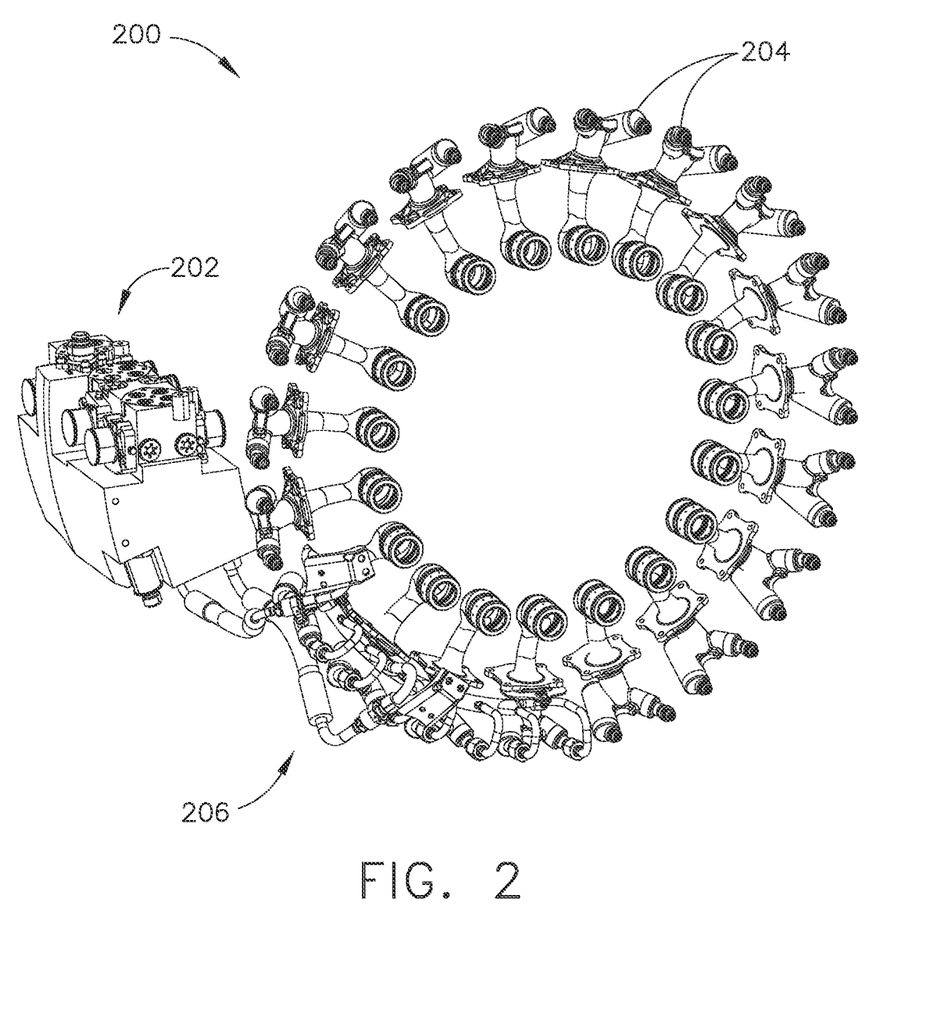
FIG. 2 is a perspective view of a fuel delivery system for use in the gas turbine engine shown in FIG. 1.

FIG. 2 is a perspective view of a fuel delivery system 200 of combustion assembly 110. Fuel delivery system 200 includes a fuel control valve 202, fuel nozzles 204, and an arrangement 206 of fuel conduits coupling control valve 202 in flow communication with at least one nozzle 204. In other embodiments, fuel delivery system 200 may be configured in any suitable manner.

Figure 3:
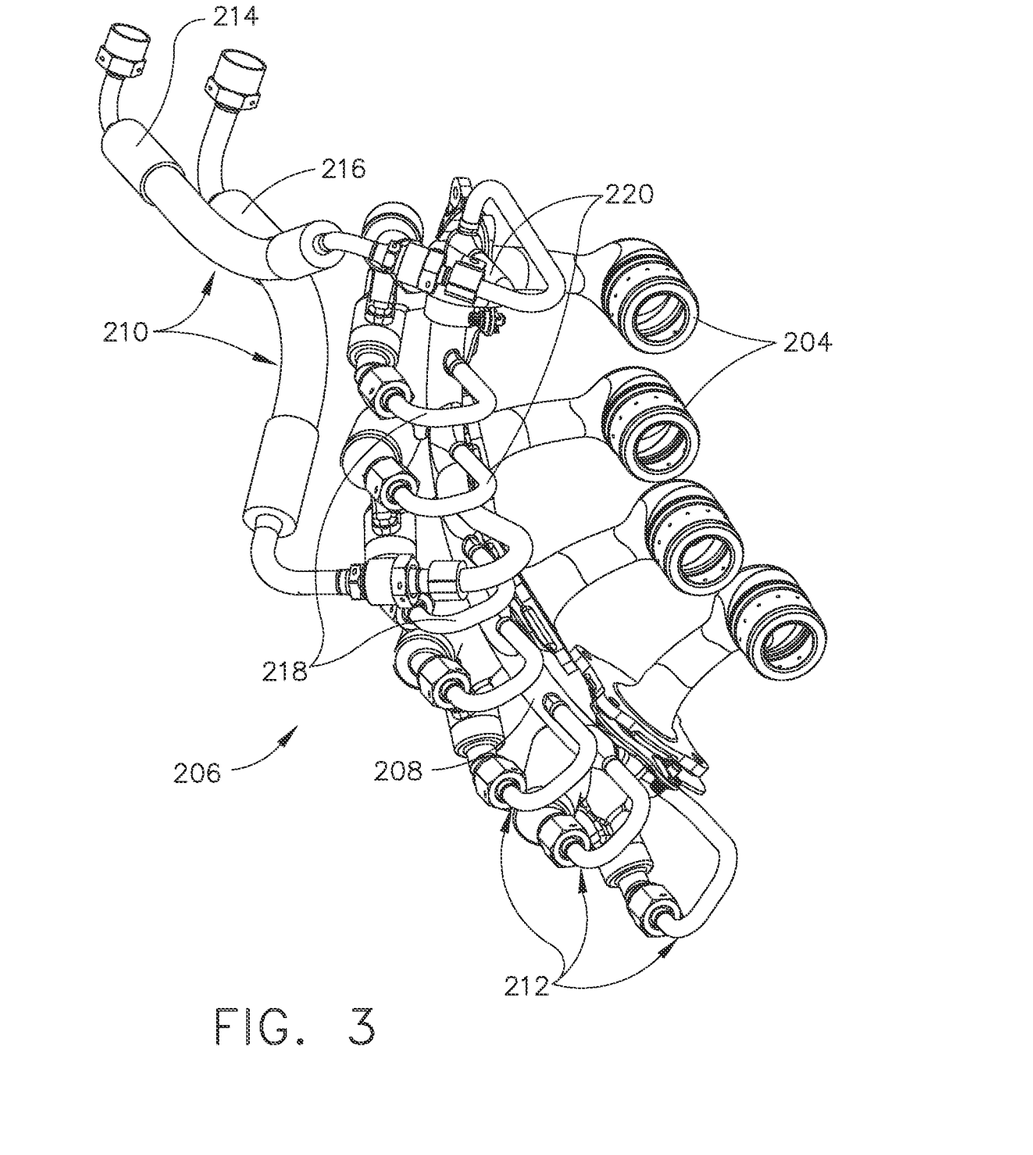
FIG. 3 is a perspective view of a fuel circuit of the fuel delivery system shown in FIG. 2.

FIG. 3 is a perspective view of fuel conduit arrangement 206. Fuel conduit arrangement 206 includes a manifold 208 (i.e., a conduit), a plurality 210 of manifold inlet conduits, and a plurality 212 of manifold outlet conduits. In the exemplary embodiment, plurality 210 of manifold inlet conduits includes a pilot fuel inlet conduit 214 and a main fuel inlet conduit 216, and plurality 212 of manifold outlet conduits includes a plurality of pilot fuel outlet conduits 218 and a plurality of main fuel outlet conduits 220, wherein one pilot fuel outlet conduit 218 and one main fuel outlet conduit 220 are configured for coupling to each nozzle 204. In this manner, pilot fuel is channeled to nozzles 204 via pilot fuel inlet conduit 214, manifold 208, and pilot fuel outlet conduits 218. Similarly, main fuel is channeled to nozzles 204 via main fuel inlet conduit 216, manifold 208, and main fuel outlet conduits 220. In some embodiments, conduits 214, 216, 218, 220 are fabricated from a flexible, polymeric material (e.g., a rubber or plastic material), and manifold 208 is fabricated from a rigid, metallic material as described in more detail below. In other embodiments, fuel conduit arrangement 206 may have any suitable number of conduits and manifolds fabricated from any suitable materials and arranged in any suitable manner for delivering any suitable fuel flow. Alternatively, the conduit arrangement described herein (e.g., manifold 208) may be suitable for uses other than fuel delivery in a gas turbine engine.

FIGS. 4-7 are perspective, side, and cross-sectional views of manifold 208. In the exemplary embodiment, manifold 208 is arcuately shaped and includes a first fuel inlet port (e.g., a pilot fuel inlet port 222 configured for coupling to pilot fuel inlet conduit 214), a second fuel inlet port (e.g., a main fuel inlet port 224 configured for coupling to main fuel inlet conduit 216), and a plurality 226 of fuel outlet ports (e.g., at least one pilot fuel outlet port 228 configured for coupling to a pilot fuel outlet conduit 218, and at least one main fuel outlet port 230 configured for coupling to a main fuel outlet conduit 220). Alternatively, manifold 208 may have any suitable number of ports arranged in any suitable manner for any suitable purpose.

Internally, manifold 208 includes a first flow path (e.g., a pilot flow path 232) and a second flow path (e.g., a main flow path 234), wherein pilot flow path 232 is disposed within (e.g., radially within) main flow path 234. In one embodiment, at least a portion of pilot flow path 232 is circumscribed by main flow path 234 (i.e., main flow path 234 wraps at least partially around pilot flow path 232). In another embodiment, at least a portion of pilot flow path 232 and a portion of main flow path 234 are concentric (i.e., the center of pilot flow path 232 is the center of curvature for the wrapping of main flow path 234 at least partially around pilot flow path 232). In some embodiments, pilot flow path 232 and main flow path 234 are integrally formed together and are fabricated using an additive manufacturing process such as, for example, a direct metal laser manufacturing (DMLM) process. In other embodiments, pilot flow path 232 and main flow path 234 may be fabricated using any suitable manufacturing method(s) (e.g., may be formed separately from, and suitably coupled to, one another).

Figure 8:
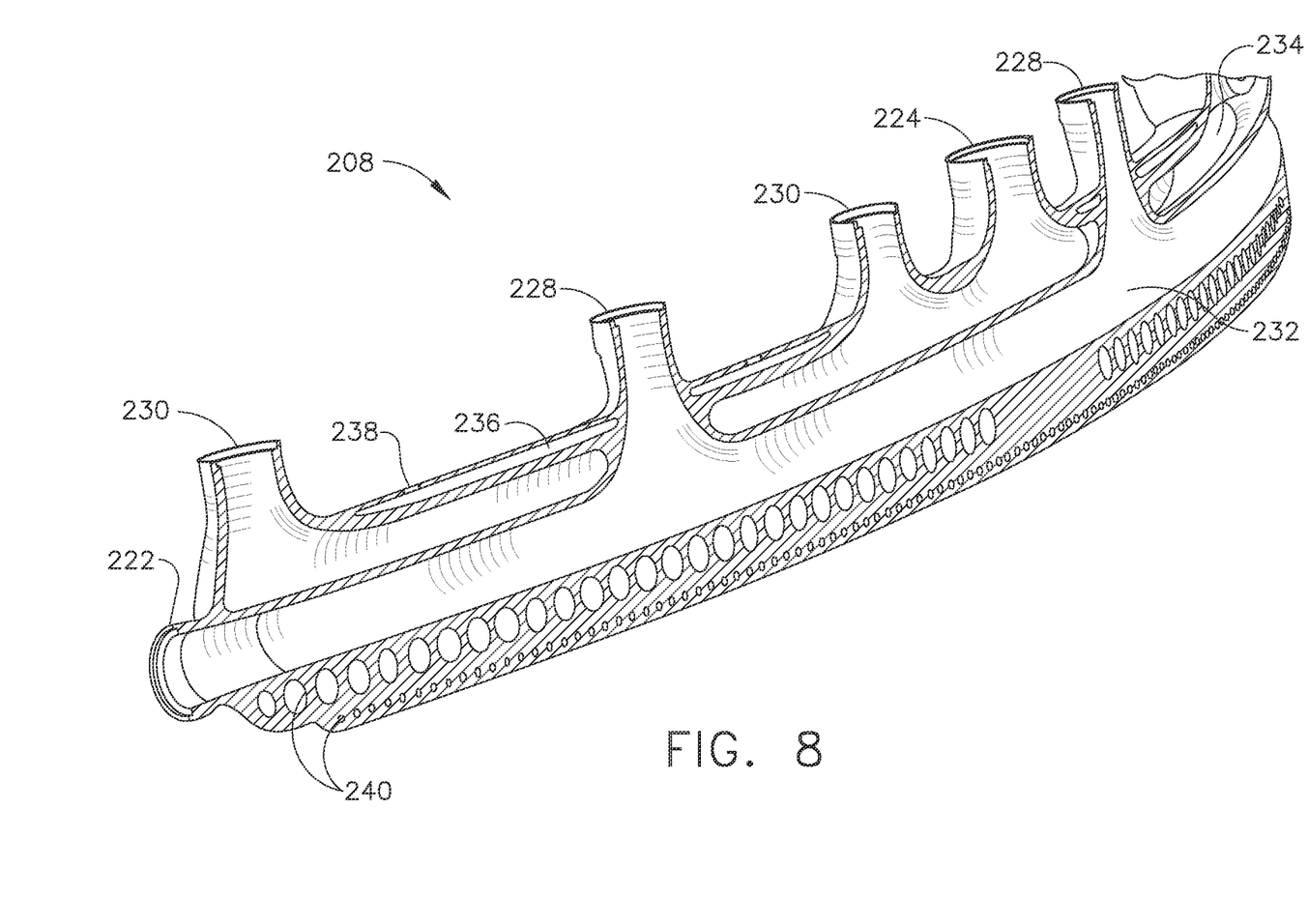
FIG. 8 is a cross-sectional view of another embodiment of the manifold shown in FIG. 4.

As shown in FIG. 8, one embodiment of manifold 208 may also include an insulation chamber 236 external to main flow path 234 (e.g., insulation chamber 236 may circumscribe at least a portion of main flow path 234 and/or may be concentric with at least a portion of main flow path 234). Insulation chamber 236 is configured to contain air and/or any other suitable insulation material (e.g., a foam material) in order to facilitate insulating fuel within main flow path 234 and, therefore, pilot flow path 232. In some embodiments, insulation chamber 236 is formed integrally with main flow path 234 and pilot flow path 232. In other embodiments, insulation chamber 236 may be formed separately from, and suitably coupled to, main flow path 234 and/or pilot flow path 232. Additionally, in some embodiments, insulation chamber 236 may be fabricated with a plurality of closeable openings 238, thereby enabling (after manifold 208 has already been formed) injection of insulation material into insulation chamber 236 and subsequent closing of openings 238. In other embodiments, manifold 208 may include a plurality of open spaces 240 that facilitate reducing the overall weight of manifold 208.

Figure 4:
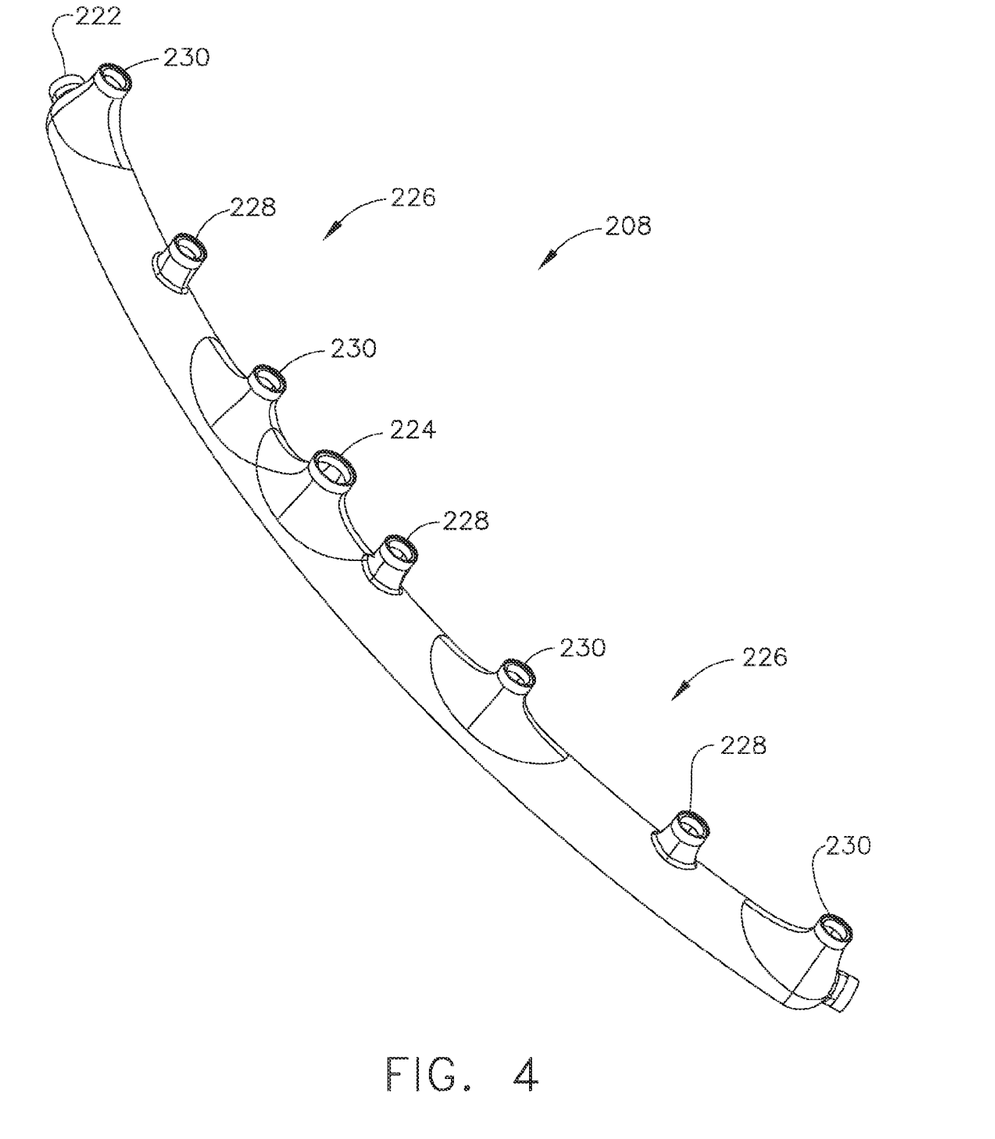
FIG. 4 is a perspective view of a manifold of the fuel circuit shown in FIG. 3.
Figure 5:
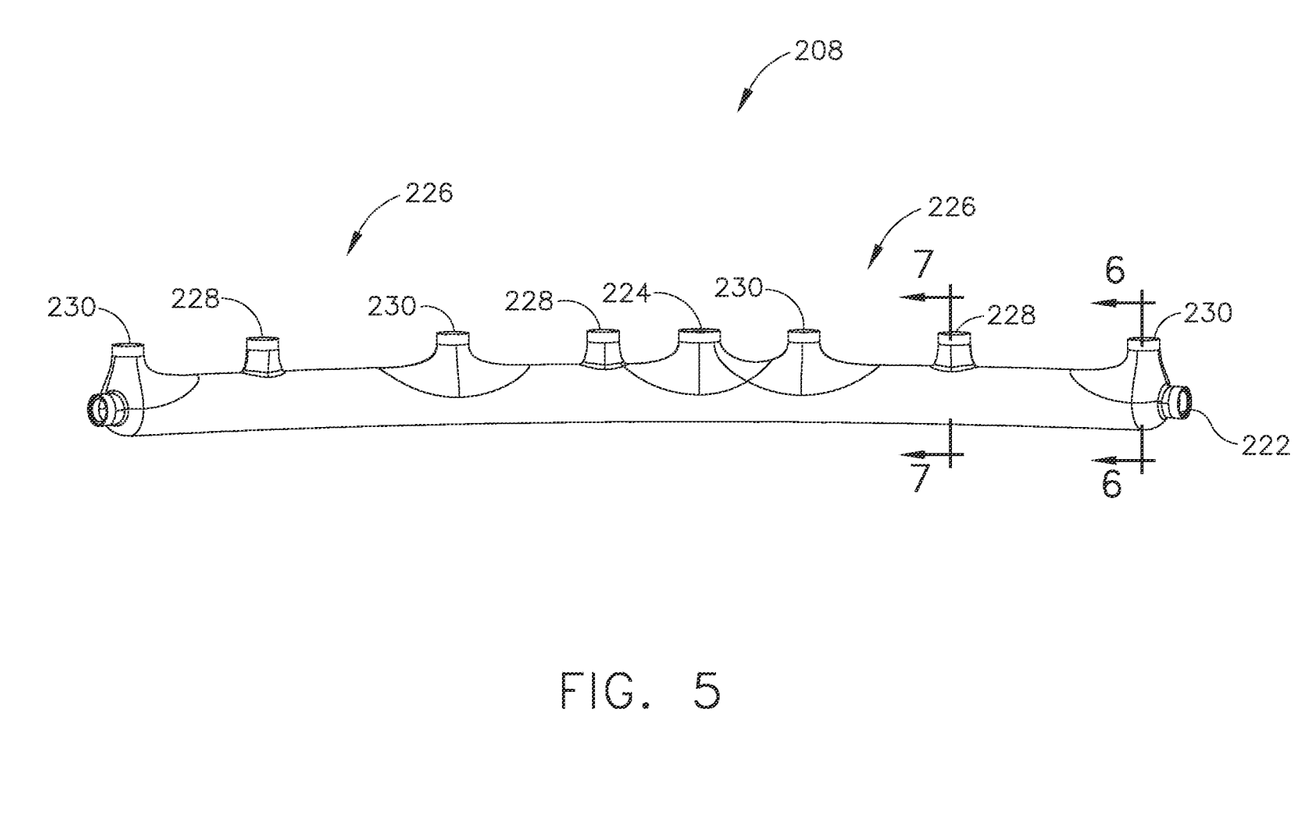
FIG. 5 is a side view of the manifold shown in FIG. 4.
Figure 6:
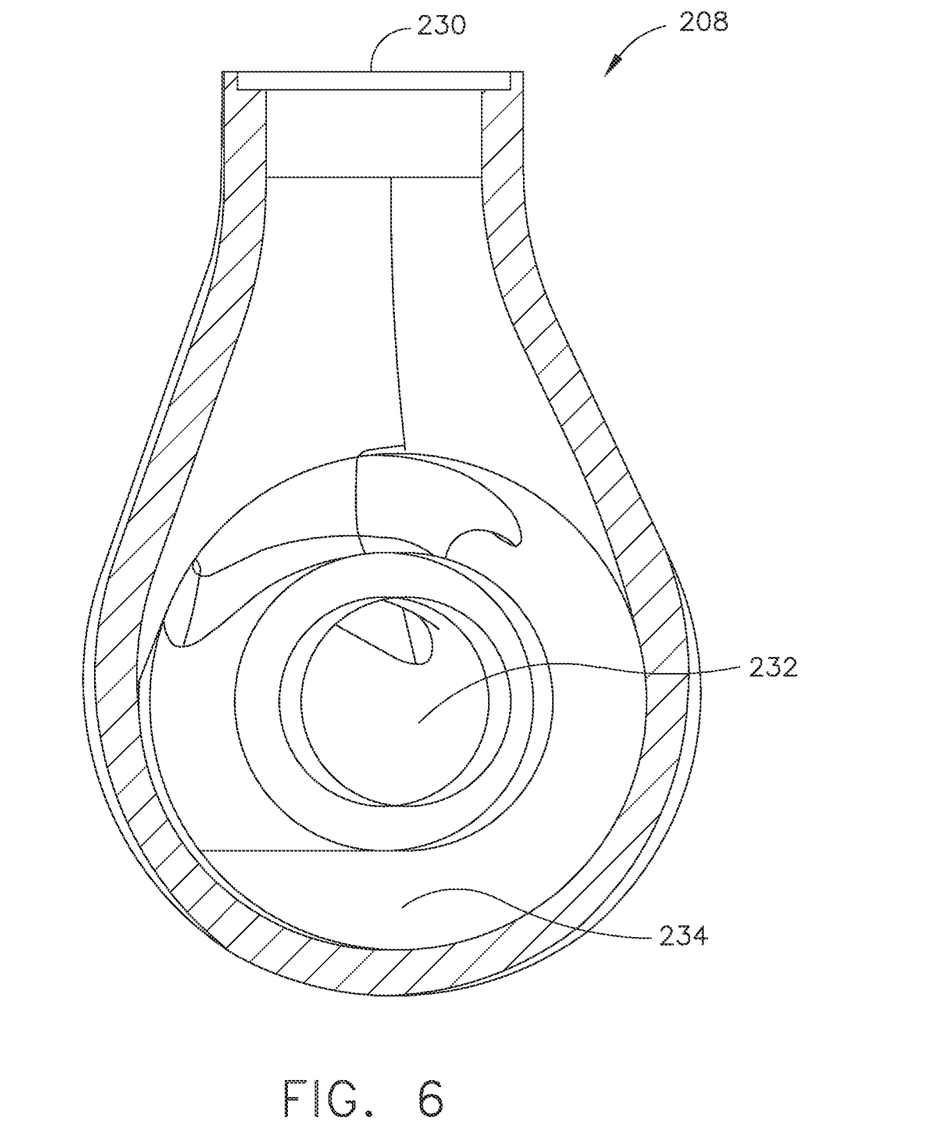
FIG. 6 is a cross-sectional view of the manifold shown in FIG. 4 taken along the plane 6-6 of FIG. 5.
Figure 7:
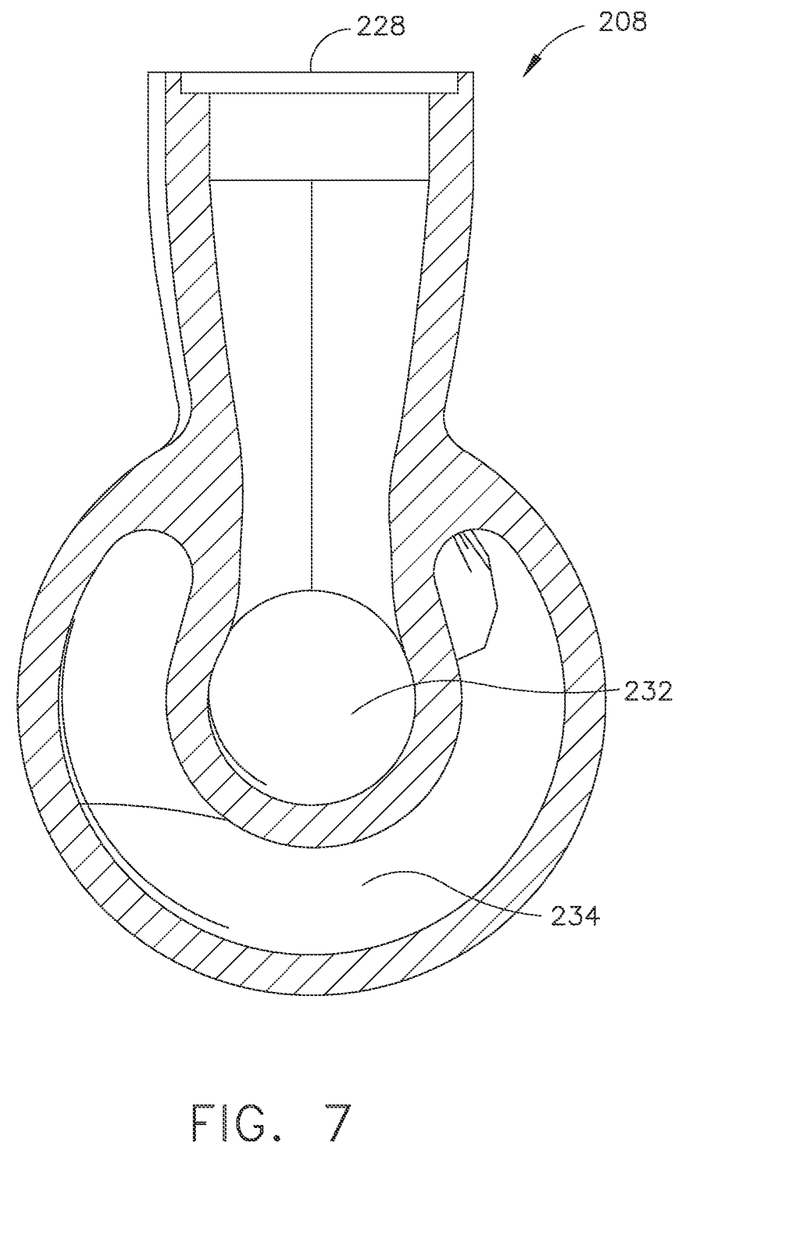
FIG. 7 is a cross-sectional view of the manifold shown in FIG. 4 taken along the plane 7-7 of FIG. 5.

During operation of gas turbine engine 100, combustion assembly 110 may utilize differing amounts of fuel amongst its various modes of operation (e.g., many operations of engine 100 utilize both main fuel and pilot fuel at the same time, but the usage proportion of main fuel to pilot fuel may vary depending upon the particular mode of operation). For example, during take-off operation of engine 100, the usage of pilot fuel (e.g., the flow rate of pilot fuel) may be greater than during cruise operation. Thus, in modes of operation during which the flow rate of pilot fuel is reduced, the fuel within pilot flow path 232 may be exposed to elevated temperatures for a greater amount of time. In that regard, because pilot flow path 232 is within main flow path 234 in the exemplary embodiment of manifold 208 (as described above), fuel flowing within main flow path 234 facilitates removing heat from, and insulating, fuel within pilot flow path 232. Thus, by configuring pilot flow path 232 within main flow path 234, manifold 208 facilitates reducing less than desirable affects of elevated temperatures on the pilot fuel when the pilot fuel is being used at a lower flow rate during some engine operations (e.g., when the pilot fuel is more stagnant and is therefore exposed to elevated temperatures for longer periods of time). For example, manifold 208 facilitates reducing the likelihood that the pilot fuel will coke during engine operation, in that some embodiments of manifold 208 may promote fuel swirling and reversed flow directions of pilot and main fuel within manifold 208 to increase heat transfer there between.

The methods and systems described herein facilitate providing a fuel manifold that facilitates improved insulation of fuel within the manifold. The methods and systems described herein also facilitate locating a pilot fuel circuit within a main fuel circuit. The methods and systems described herein also facilitate locating the main fuel circuit within an annular insulation chamber for additional insulation benefits. The methods and systems described herein further facilitate enabling a radially outer flow of fuel to transfer heat away from a radially inner flow of fuel during operating conditions at which the radially inner fuel flows at a decreased rate. The methods and systems described herein further facilitate lowering the heat transfer into the fuel which leads to coking of the fuel in the fuel nozzles. The methods and systems described herein further facilitate enabling less volume occupied by a fuel manifold in an external engine environment, in addition to enabling improved specific fuel consumption (SFC) with secondary scheduling and increased oil cooling capability. The methods and systems described herein therefore facilitate providing a lower weight and lower cost solution to preventing fuel nozzle coking and reducing part count (e.g., by reducing the amount of piping exposed to the harsher environments and better controlling the temperature increase of the fuel as the fuel flows from the fuel control valve to the fuel nozzles).

Exemplary embodiments of a fluid conduit and a method of fabricating the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with only gas turbine engines as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A gas turbine engine comprising: a compressor assembly; and a combustion assembly in flow communication with said compressor assembly, wherein said combustion assembly comprises a plurality of fuel nozzles and a fluid conduit for delivering fuel to said fuel nozzles, said fluid conduit comprising: a plurality of first inlet ports that are spaced apart from one another along said fluid conduit; a plurality of second inlet ports that are spaced apart from one another along said fluid conduit; a plurality of first outlet ports that are spaced apart from one another along said fluid conduit; a plurality of second outlet ports that are spaced apart from one another along said fluid conduit; a first flow path extending along said fluid conduit in flow communication with said first inlet ports and said first outlet ports; and a second flow path extending along said fluid conduit in flow communication with said plurality of second inlet ports and said plurality of second outlet ports, wherein at least a portion of said first flow path is circumscribed by said second flow path, wherein said plurality of first inlet ports are distinct from said plurality of second inlet ports, and wherein the second flowpath is annular and the second flow path encloses the first flowpath at the location of each of said plurality of second outlet ports.

2. A gas turbine engine in accordance with claim 1, wherein said fluid conduit is arcuately shaped.

3. A gas turbine engine in accordance with claim 1, wherein at least a portion of said first flow path and a portion of said second flow path are concentric.

4. A gas turbine engine in accordance with claim 1, wherein said first flow path and said second flow path are integrally formed together using an additive manufacturing fabrication process.

5. A gas turbine engine in accordance with claim 1, wherein said fluid conduit further comprises an insulation chamber circumscribing at least a portion of said second flow path.

6. A gas turbine engine in accordance with claim 5, wherein said insulation chamber is formed integrally with said first flow path and said second flow path using an additive manufacturing fabrication process.

7. A gas turbine engine in accordance with claim 1, wherein said first outlet ports extend through said second flow path.

8. A gas turbine engine in accordance with claim 1, wherein said combustion assembly is configured to channel pilot fuel through said first flow path and said first outlet ports, and is configured to channel main fuel through said second flow path and said second outlet ports, wherein one of said first outlet ports and one of said second outlet ports are associated with each of said nozzles.

9. A fluid conduit for a combustion assembly of a gas turbine engine, said fluid conduit comprising: a plurality of first inlet ports that are spaced apart from one another along said fluid conduit; a plurality of second inlet ports that are spaced apart from one another along said fluid conduit; a plurality of first outlet ports that are spaced apart from one another along said fluid conduit; a plurality of second outlet ports that are spaced apart from one another along said fluid conduit; a first flow path extending along said fluid conduit in flow communication with said plurality of first outlet ports; and a second flow path extending along said fluid conduit in flow communication with said plurality of second outlet ports, wherein at least a portion of said first flow path is circumscribed by said second flow path, wherein each of said plurality of first outlet ports is coupled to a respective fuel nozzle of the gas turbine engine combustion assembly and occurs at different circumferential locations along said fluid conduit from each of said plurality of second outlet ports, each of said plurality of second outlet ports being coupled to the respective fuel nozzle, wherein each of said plurality of first inlet ports occurs at different circumferential locations along said fluid conduit from each of said plurality of second inlet ports, and wherein the second flowpath is annular and the second flow path encloses the first flowpath at the location of each of said plurality of second outlet ports.

10. A fluid conduit in accordance with claim 9, wherein said fluid conduit is arcuately shaped.

11. A fluid conduit in accordance with claim 9, wherein at least a portion of said first flow path and a portion of said second flow path are concentric.

12. A fluid conduit in accordance with claim 9, wherein said first flow path and said second flow path are integrally formed together using an additive manufacturing fabrication process.

13. A fluid conduit in accordance with claim 9, wherein said fluid conduit further comprises an insulation chamber circumscribing at least a portion of said second flow path.

14. A fluid conduit in accordance with claim 13, wherein said insulation chamber is formed integrally with said first flow path and said second flow path using an additive manufacturing fabrication process.

15. A fluid conduit in accordance with claim 9, wherein said first outlet ports extend through said second flow path.

16. A gas turbine engine comprising: a compressor assembly; and a combustion assembly in flow communication with said compressor assembly, wherein said combustion assembly comprises a plurality of fuel nozzles and a fluid conduit for delivering fuel to said fuel nozzles, said fluid conduit comprising: a plurality of pilot fuel inlet ports that are spaced apart from one another along said fluid conduit; a plurality of main fuel inlet ports that are spaced apart from one another along said fluid conduit; a plurality of pilot fuel outlet ports that are spaced apart from one another along said fluid conduit; a plurality of main fuel outlet ports that are spaced apart from one another along said fluid conduit; a pilot fuel flow path extending along said fluid conduit in flow communication with said plurality of pilot fuel inlet ports and said plurality of pilot fuel outlet ports; and a main fuel flow path extending along said fluid conduit in flow communication with said plurality of main fuel inlet ports and said plurality of main fuel outlet ports, wherein at least a portion of said pilot fuel flow path is circumscribed by said main fuel flow path, wherein said plurality of pilot fuel inlet ports are distinct from said plurality of main fuel inlet ports, and wherein the main flowpath is annular and the main flow path encloses the pilot flowpath at the location of each of said plurality of main fuel outlet ports.

17. A gas turbine engine in accordance with claim 16, further comprising
a fuel flow valve configured to control fuel flow to said pilot fuel flow path and said main fuel flow path in varying proportions.

18. A gas turbine engine in accordance with claim 16, wherein said pluralities of pilot and main fuel inlet and outlet ports comprise a polymer material,
wherein said pilot and main fuel flow paths comprise a metallic material.

19. A gas turbine engine in accordance with claim 16, wherein said plurality of pilot fuel inlet ports and said plurality of main fuel inlet ports alternate along said fluid conduit.

20. A gas turbine engine in accordance with claim 16, wherein said combustion assembly comprises an equal number of said pluralities of pilot fuel inlets, said main fuel inlets, said pilot fuel outlets, said main fuel outlet and said fuel nozzles.

\* \* \* \* \*